Figure 1A:
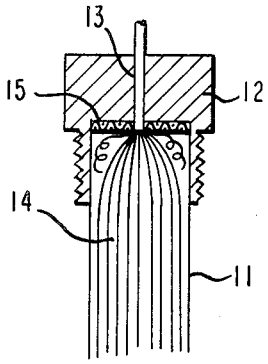
Figure 2A:
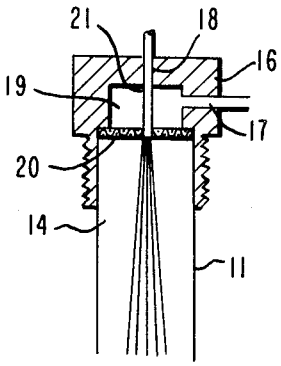
Figure 1B:
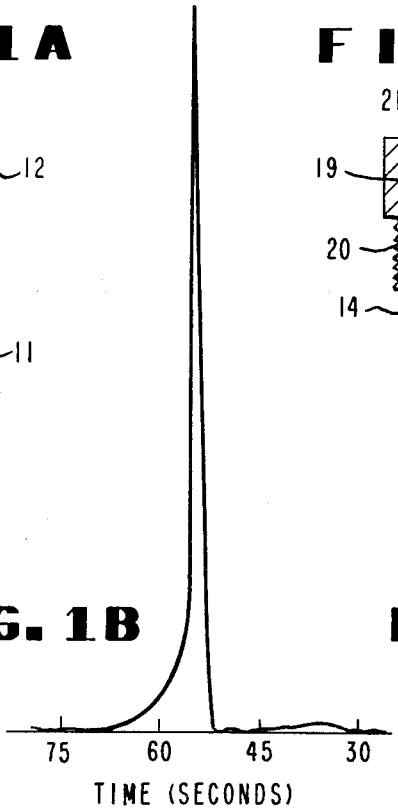
Figure 2B:
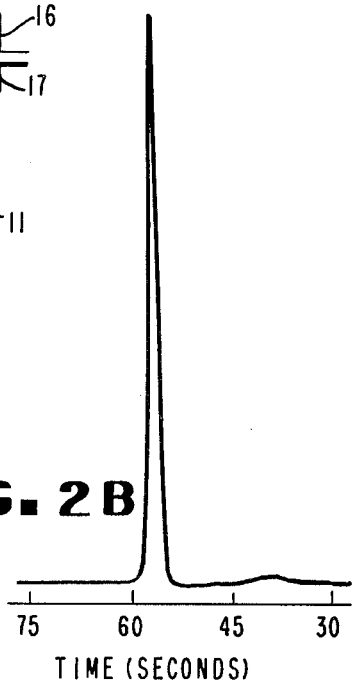
Figure 3:
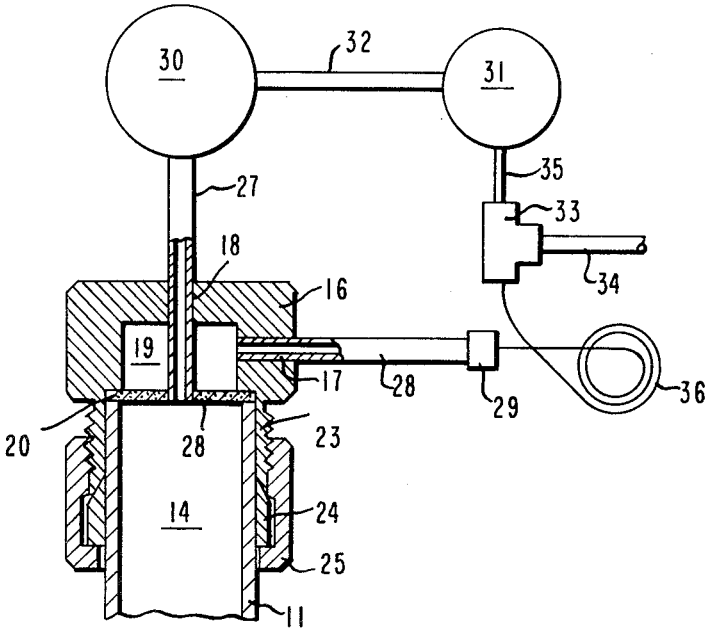
Figure 4:
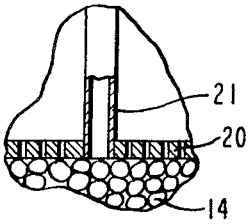
Figure 5:
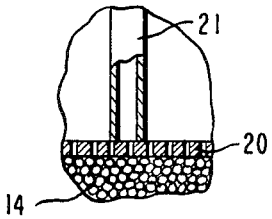

United States Defensive Publication [19] (H) [11] T959,004

Kirkland et al. [43] June 7, 1977

[54] CHROMATOGRAPHIC LIQUID DISPENSING INLET AND METHOD

[75] Inventors: Joseph Jack Kirkland, Wilmington; Charles Heritage Dilks, Jr., Newark, both of Del.

[73] Assignee: E. I. Du Pont de Nemours and Company, Wilmington, Del.

[21] Appl. No.: 690,314

[22] Filed: May 26, 1976

[51] Int. Cl.[2] ..... B01D 15/08

[52] U.S. Cl. ..... 210/31 C; 210/198 C

[57] ABSTRACT

The chromatographic separation efficiency of a sample liquid injected into a resolving zone and eluted through the resolving zone with a liquid carrier or mobile phase is improved if the sample is injected at a point located centrally on the inlet end of the resolving zone and the eluting carrier liquid is applied uniformly across substantially the entire inlet end of the resolving zone surrounding the sample injection point.

To accomplish this, the present invention provides a liquid dispensing inlet for a liquid chromatographic column comprising: a housing having formed therein a recess and first and second channels; each channel connecting the recess to the external surface of the housing, and a dispensing tube for dispensing liquid to a point at the inlet end of the column, the dispensing tube being disposed within the recess with one end connected to the second channel of the housing and the second end being disposed adjacent to the inlet end of the column, the inlet further comprises a dispensing member, in the form of a screen or a porous plate, dispose between the inlet end of the column and the recess in the housing.

10 Claims, 1 Sheet Drawing,

14 Pages Specification

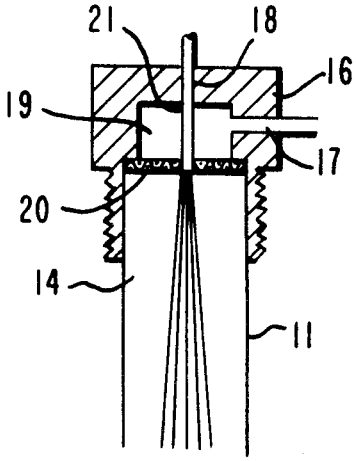

The file of this unexamined application may be inspected and copies thereof may be purchased (849 O.G. 1221, Apr. 9, 1968).